[19] United States Patent
Korpman et al.

[11] Patent Number: 5,274,036
[45] Date of Patent: Dec. 28, 1993

[54] PRESSURE SENSITIVE ADHESIVE

[75] Inventors: Ralf Korpman; Vera Korpman, both of Bridgewater, N.J.; Michael Korpman, Longwood, Fla.; Dennis Korpman, Beaumont, Tex.

[73] Assignee: Ralf Korpman Associates, Bridgewater, N.J.

[21] Appl. No.: 977,580

[22] Filed: Nov. 17, 1992

[51] Int. Cl.$^5$ ............................ C08L 53/02; C08L 9/06
[52] U.S. Cl. .................................. 525/92; 525/98; 525/99
[58] Field of Search .................... 525/92, 98, 99

[56] References Cited

U.S. PATENT DOCUMENTS

| | | | |
|---|---|---|---|
| 2,999,769 | 8/1961 | Korpman | 340/870.43 |
| 3,231,419 | 1/1966 | Korpman | 427/208.4 |
| 3,402,220 | 9/1968 | Bierman et al. | 525/196 |
| 3,484,405 | 12/1969 | Seto | 524/515 |
| 3,535,153 | 10/1970 | Korpman | 428/355 |
| 3,625,752 | 12/1971 | Korpman | 428/355 |
| 3,676,202 | 7/1972 | Korpman | 428/355 |
| 3,917,605 | 11/1975 | Crossland | 546/90 |
| 3,956,223 | 5/1976 | Chiang | 524/482 |
| 4,037,016 | 7/1977 | Habeck et al. | 428/349 |
| 4,080,348 | 3/1978 | Korpman | 524/505 |
| 4,136,071 | 1/1979 | Korpman | 524/534 |
| 4,335,026 | 6/1982 | Balinth | 524/271 |
| 4,370,448 | 1/1983 | Leland | 525/99 |
| 4,600,745 | 7/1986 | Creighton | 524/534 |
| 4,645,792 | 2/1987 | Von Hellens et al. | 524/518 |
| 4,684,672 | 8/1987 | Buchanan et al. | 523/100 |
| 4,699,938 | 10/1987 | Minamizaki et al. | 524/271 |
| 4,808,657 | 2/1989 | Brown | 524/518 |
| 4,853,432 | 8/1989 | Ahner | 524/274 |
| 4,885,338 | 12/1989 | Takao et al. | 525/77 |
| 5,036,132 | 7/1991 | Coran | 524/526 |
| 5,039,750 | 8/1991 | Miller et al. | 525/237 |
| 5,100,963 | 3/1992 | Lin | 525/221 |

FOREIGN PATENT DOCUMENTS 2057916  4/1981  United Kingdom .

Primary Examiner—James J. Seidleck
Assistant Examiner—I. Zemel
Attorney, Agent, or Firm—Mathews, Woodbridge & Collins

[57] ABSTRACT

This invention relates to a novel pressure sensitive adhesive formed of a liquid and solid rubber which is substantially resin free. Preferably the adhesive is formed of a weight ratio of solid rubber to liquid rubber of about 1:0.5 to about 1:7. These adhesives exhibit improved adhesion in cold weather and oily surface applications and other properties. The pressure sensitive adhesives can be used in health care, industrial and drug delivery systems.

15 Claims, No Drawings

PRESSURE SENSITIVE ADHESIVE

FIELD OF INVENTION

This invention relates to novel pressure sensitive adhesive compositions formed of a combination of liquid and solid rubbers for providing adhesive properties.

DESCRIPTION OF THE RELATED ART

Pressure-sensitive adhesives are materials which have tack properties at room temperature. The pressure-sensitive adhesive firmly adheres to a variety of dissimilar surfaces without the need of more than finger or hand pressure. It is known that the adhesive should also be formed of a composition with sufficient internal strength to prevent leaving a residue of the adhesive on the application surface after the adhesive has been removed. The problems of providing excellent skin adhesion and having the ability to be applied to a variety of surfaces at a wide temperature range has persisted in conventional rubber based adhesives.

The properties of pressure sensitive adhesive depend primarily on the viscoelastic nature of the adhesive. Prior art conventional rubber based adhesives are formed from two major ingredients: elastic rubber and resinous tackifier. The rubber provides the elastic component and the resin the viscous component. For any given adhesive the tackifying resin determines the viscoelastic behavior and the final properties of the adhesive and, thus, is a vital part of the adhesive. The tackifying resins constitute an important, and even essential, raw material in formulating rubber based pressure sensitive adhesives. *Handbook of Adhesives,* Third Edition, page 644, edited by Irving Skeist, *Handbook of Pressure Sensitive Adhesive Technology,* Second Edition by Donatas Satas page 261, 527. Typically, conventional tackifiers have the criteria that the glass transition temperature (Tg) of the tackifier is higher than the Tg value of the base elastomer. Conventional tackifiers are brittle glassy solids having Tg values above room temperature, typically in the range of about 30°-60° C.

A typical pressure-sensitive adhesive is described in U.S. Pat. No. 4,335,026. In this adhesive, natural or synthetic rubber is used with a solid tackifier resin to impart to the rubber tackiness properties. The tackifier resin can be formed of a solid polyterpene or solid rosins and mixtures thereof. The solid tackifier comprises from about 30% to about 50% by weight of the total composition.

U.S Pat. No. 4,037,016 describes an adhesive composition comprising an admixture of at least one of natural and synthetic rubber with a tackifying resin containing carbon-to-carbon unsaturation therein. The content of the resin is about 60 to about 140 parts by weight of the composition.

U.S. Pat. No. 3,402,220 describes a mixture of two rubbers having different hardness and solubility characteristics. A soft elastomeric uncured copolymer is mixed with a minor amount of a relatively hard elastomeric cured copolymer. The mixture is used for caulking o sealing of containers and is not used for pressure sensitive adhesives.

Of possible general relevance to the invention are U.S. Pat. Nos. 3,484,405; 4,335,026 and 4,699,938 describing blends of rubbers and tackifying resins.

SUMMARY OF INVENTION

Briefly described, the present invention comprises a pressure-sensitive adhesive formed of a liquid rubber and a solid rubber. Preferably, liquid rubber and solid rubber are used in a weight ratio of solid to liquid rubber of about 1:0.5 to about 1:7 by weight.

It has now been discovered that novel pressure sensitive adhesives can be made using only rubber which are substantially free of the resins used in conventional adhesives. The solid rubber and the liquid rubber have similar Tg values.

In accordance with the teachings of the invention, solid rubbers useful in forming the pressure sensitive adhesive include elastomers such as natural rubber, block copolymers based on styrene butadiene, styrene isoprene, styrene ethylene-butylene. Liquid rubbers useful in this invention are synthetic liquid isoprene rubber, depolymerized natural rubber, carboxyl terminated synthetic liquid isoprene styrene rubber, hydroxyl terminated synthetic liquid isoprene rubber, hydrogenated liquid isoprene rubber, liquid isoprene-styrene copolymer, liquid isoprene-butadiene liquid butadiene-styrene copolymer.

The pressure sensitive adhesives of the present invention are substantially resin free. Superior results have been obtained for human skin applications and for general applications including cold weather and oily surface applications.

DETAILED DESCRIPTION OF THE INVENTION

In accordance with the principals of this invention, pressure sensitive adhesives having improved characteristics are formed by combining a solid rubber and a liquid rubber. It is known that solid rubber alone is not tacky enough to produce pressure sensitive adhesions. It has now been found that the addition of liquid rubber imparts to the solid rubber a degree of adhesiveness and tackiness which was conventionally achieved by the addition of tackifying resins.

A pressure sensitive adhesive is formed by adding together a liquid rubber and a solid rubber in a weight ratio of about 1:0.5 to about 1:7 by weight of solid rubber to liquid rubber. The amount of liquid rubber used is varied for the desired degree of adhesiveness and tackiness of the pressure sensitive adhesive. Most preferably, a weight ratio of about 1:1.5 to about 1:3.5 by weight of solid rubber to liquid rubber is used for adhesion to skin.

Solid rubbers useful in practice of this invention include conventional diene elastomers such as natural rubber, neoprene, and block co-polymers based on styrene-butadiene, styrene-isoprene or styrene ethylene-butylene. Also, a low styrene synthetic copolymer of butadiene and styrene, commonly called SBR, can be used as a solid rubber.

The elastomeric component may consist essentially of linear or radial A-B-A block copolymers or mixtures of these A-B-A block copolymers with simple A-B block copolymers. However, the proportion of A-B block copolymers in the mixture of A-B-A and A-B block copolymers should not exceed about 85% by weight and lower percentages normally would be used. Elastomeric components useful for practice of the present invention are described in U.S. Pat. No. 4,662,874 which is hereby incorporated by reference.

The A-B-A block copolymers are of the type which consist of A-blocks (end blocks) derived, i.e., polymerized or copolymerized, from styrene or styrene homologs; and B-blocks (center blocks) derived from conjugated dienes, such as isoprene or butadiene, or from lower alkenes, such as ethylene and butylene. Small proportions of other monomers also may enter into the block copolymers themselves. The individual A-blocks have a number average molecular weight of at least about 6,000, preferably in the range of about 8,000–30,000, and the A-blocks constitute about 5–50 percent, preferably about 10–30 percent, by weight of the block copolymer. The number average molecular weight of the B-blocks for linear A-B-A block copolymers preferably is in the range of about 45,000–180,000 and that of the linear copolymer, itself, preferably is in the range of about 75,000–225,000. The number average molecular weight of the radial A-B-A copolymers preferably is in the range of about 125,000–400,000. The designation A-B-A includes what are sometimes called A-B-C block copolymers wherein the end blocks are different from one another but both are derived from styrene or styrene homologs. This applies both to linear and radial block copolymers. The term "linear block copolymer" (or copolymers) includes branched A-B-A.

The radial A-B-A polymers useful in this invention are of the type described in U.S. Pat. No. 3,281,383 and conform to the following general formula: $(A-B)_nX_1$ wherein A is a thermoplastic block polymerized from styrene or styrene homologs, B is an elastomeric block derived from conjugated dienes or lower alkenes, as indicated above, X is an organic or inorganic connecting molecule with a functionality of 2–4 as described in U.S. Pat. No. 3,281,383 or possibly with a higher functionality as described in the article entitled "New Rubber is Backed by Stars" appearing on page 35 of the Jun. 11, 1975 issue of Chemical Week "n" then is a number corresponding to the functionality of X.

The A-B block copolymers useful for this invention are of the type described in U.S. Pat. Nos. 3,519,585 and 3,787,531 and comprise A and B-blocks derived from the monomers described hereinbefore in connection with the A-B-A copolymers.

Liquid rubbers useful in this invention are synthetic liquid isoprene rubber, depolymerized natural rubber, carboxyl terminated synthetic liquid isoprene styrene rubber, hydroxyl terminated synthetic liquid isoprene rubber, hydrogenated liquid isoprene rubber, liquid isoprene-styrene copolymer, liquid isoprene-butadiene liquid butadiene-styrene copolymer.

The liquid rubbers have a molecular weight of about 25,000 to about 50,000. Preferably, the liquid rubbers have a glass transition temperature of less than $-50°$ C., on a melt viscosity at 38° C. of between 500–10,000 poises. It will be appreciated that other liquid rubbers known in the art could be useful with the teachings of the present invention.

Pressure sensitive adhesives of the present invention can be adapted to be vulcanized or cross-linked so as to render the pressure sensitive adhesive composition more resistant to elevated temperatures and to solvents while retaining a balance of adhesion and cohesion properties enabling the composition to remain tacky and pressure sensitive. Ultraviolet, high energy radiation or heat curing with any conventional diene elastomer curing system can be used. Preferably, an oil soluble heat reactive phenol formaldehyde resin is used as a curing agent by using about 5–40 parts of phenol formaldehyde resin with about per 100 of solid rubber. Preferably, 10–25 parts of phenol formaldehyde resin is used per 100 of solid rubber.

The resin curing agents mentioned above are combined with accelerators. Conventional accelerators such as zinc resinate or alkaline fillers, as disclosed in U.S. Pat. No. 3,625,752, or acid accelerators, such as disclosed in U.S. Pat. No. 3,231,419, can be used with the pressure sensitive adhesive and resin curing agents of the present invention. Preferably, zinc resinate is used as an accelerator and in amounts less than 40 parts to 100 of the solid rubber. Preferably, the zinc resinate as an accelerator is added in the amount of 5 to 25 parts.

The pressure sensitive adhesives of this invention can include small amounts of other materials such as tackifier antioxidants, heat stabilizers, pigments, ultraviolet absorbers, and the like. Typical antioxidants are 2.5 ditertiary amyl hydroquinone and ditertiary butyl cresol. Also, conventional heat stabilizers such as the zinc salts of alkyl dithiocarbonates can be used in the present invention. Also, the particulate mixture of this invention can include fillers such as zinc oxide, aluminum hydrate, clay, calcium carbonate, carbon black, titanium dioxide, and others.

The following examples are given only by way of illustration and are not intended to limit the scope of the invention in any way.

Table A gives the adhesive composition formulations for examples I–VII. In the examples, all proportions are expressed in parts per one hundred parts by weight of the solid elastomeric component unless otherwise indicated.

TABLE A

| Ingredients | I | II | III | IV | V | VI | VII |
|---|---|---|---|---|---|---|---|
| Solid Rubber | | | | | | | |
| Kraton 1112 | 100 | 100 | 100 | | | 100 | |
| Kraton D 1320 | | | | | | | 100 |
| Kraton 1657 | | | | | 100 | | |
| Kraton 1102 | | | | 100 | | | |
| Liquid Rubber | | | | | | | |
| Kuraray LIR 310 | 200 | 400 | 600 | | | 200 | 200 |
| Kuraray LIR 50 | | | | 300 | | | |
| Kuraray 290 | | | | | 300 | | |
| Schenectady SP 1044 | | | | | | 35 | |
| Zirex | | | | | | | 25 |
| Typical Skin adhesion | | | | | | | |
| gm/inch | 168 | 336 | 112 | 392 | 84 | 210 | 150 |

With respect to the foregoing examples, the following comments are made with respect to a number of ingredients listed in the examples.

The Thermoplastic solid rubbers designated as "Kraton" are offered commercially from Shell Chemical Company.

"Kraton 1112" is a linear styrene-isoprene-styrene (SIS) copolymer containing approximately 14% of styrene and with approximately 35% diblock.

"Kraton D 1320" is a branched SIS block copolymer having 10 % styrene. It is readily radiation crosslinkable.

"Kraton 1657" is a linear styrene-ethylene-butylene-styrene copolymer. It has approximately 13% styrene.

"Kraton 1102" is a linear styrene-butadiene-styrene copolymer. It has approximately 28% styrene.

The thermoplastic liquid rubbers in the above examples are products of Kuraray Co. Ltd., Tokyo, Japan.

"Kuraray LIR 310" is a liquid isoprene-styrene copolymer having a molecular weight of approximately 30000.

"Kuraray LIR 50" is a liquid isoprene polymer having a molecular weight approximately 47000.

"Kuraray LIR 290" is a liquid hydrogenated isoprene polymer having a molecular weight of approximately 25000.

"The Schenectady SP 1044" is a heat reactive octyl phenol formaldehyde resin supplied by Schenectady Chemical Company.

"Zirex" is zinc resinate commercially available from Arizona Chemical Company and it functions as an accelerator to heat reactive phenolic resin cures.

A predetermined constant pressure is applied to apply the tape to skin. Typical skin adhesion is measured by peeling the adhesive away from skin at 90° at a constant speed (by a force applied to the free end of a tape).

The pressure sensitive adhesives can be used as free films or coated on a substrate. Also, the adhesives can be made into solvent cement or applied from hotmelt.

When a substrate is used, the adhesives are coated, such as by solvent, calendar or hotmelt processes to the substrate. Suitable substrates can be film, foil, paper, cloth, foam or the like. When the pressure sensitive adhesive is solvent coated, the solid/liquid rubber composition is solvated in a suitable solvent like toluene prior to coating, followed by evaporation of the solvent. In a hotmelt process, the liquid is heated to a temperature of about 300° F. in a heated kettle. The solid rubber is stirred into the liquid until smooth. Alternatively, solid rubber can be mixed with the liquid rubber in a single or twin screw extruder. A hotmelt coating is applied via roller, slot die, spray or any other convenient hotmelt coating method. The hotmelt process has the advantage of being ecology safe.

The coated substrates described above can be slit into desired widths to form pressure sensitive adhesive tapes or bandages. Each of the adhesives possesses superior finger tack, i.e., the ability to stick to the finger when the finger is pressed against the adhesive side of the tape. In fact, the tapes exhibit superior skin adhesion when adhered to other parts of the body and in general are able to adhere to oily surfaces. Thus, they are suited for a variety of applications where adhesion is desired despite the presence of some oil on the application surface.

| EXAMPLES VIII-XII | | | | | |
|---|---|---|---|---|---|
| | | | | Control | |
| Ingredients | VII | IX | X | XI | XII |
| Kraton 1112 | 100 | 100 | 100 | | 100 |
| Kuraray 310 | 200 | 400 | 600 | | |
| Natural Rubber | | | | 100 | |
| Wingtack plus | | | | 100 | 100 |
| Ethanox 300 | 2 | 2 | 2 | 2 | 2 |
| Skin adhesion gms/inch | | | | | |
| 5 minutes | 75 | 420 | 100 | 140 | 50 |
| 24 hours | 168 | 336 | 112 | 56 | 28 |

A demonstration of improvements obtained by the practice of the present invention is shown by a comparison of examples VIII-XII. The pressure sensitive adhesive compositions were subject to a skin adhesion test. Prior art natural rubber resin systems Example XI and XII lose adhesion to the skin within hours after application of between 44%-60%. Examples VIII and X shows improved adhesion to the skin over time. Example IX indicates a reduced loss of adhesion of 20%.

| EXAMPLE XIII | |
|---|---|
| Ingredients | Tg Value °C. |
| Kraton 1112 | −60 |
| Kraton D 1320 | −60 |
| Kraton 1657 | −50 |
| Kraton 1102 | −90 |
| Duraray LIR 310 | −63 |
| Kuraray LIR 50 | −63 |
| Kuraray LIr 290 | −59 |
| Tackifier | 30° − (+) 60° |

The above table compares the Tg values for components of the pressure sensitive adhesive to a Tg value of a conventional tackifier.

The pressure sensitive adhesive of the present invention have advantageous surface wetting properties at low temperatures. The pressure sensitive adhesives of the present invention are useful below room temperature and at temperatures below −20° C. The use of a tackifying resin in conventional adhesives limits the adhesive use at low temperatures. The Tg of tackifying resins is from 30° C. to +60° C. The Tg of liquid rubbers is about −55° C. The lower range of Tg values of the present invention allows for improved performance at low temperatures.

EXAMPLE XIV

Addition of a thermoplastic triblock solid rubber, such as Kraton D 1114X which is a 100 percent triblock with 19% styrene content with a diblock liquid rubber, such as Kuraray LIR 310, exhibits exceptionally stable properties. Styrene of the diblock combines with styrene in the triblock to form a non-migratory adhesive composition. Conventional rubber/resin compositions do not exhibit this property.

EXAMPLE XV

The compositions of the present invention exhibit superior skin wetting properties. When a coated tape of the adhesive of the present invention is adhered to the skin without using pressure to apply, the coated type exhibits superior ability to stick to the skin compared to a conventional rubber resin composition.

EXAMPLE XVI

The pressure sensitive adhesive of the present invention comprised of synthetic solid and liquid rubbers has the advantage of being colorless and odorless. Conventional tackifiers impart a yellow/brownish discoloration to the adhesive.

EXAMPLE XVII

The pressure sensitive adhesive of the present invention comprised of synthetic solid and liquid rubbers has the advantage of being free from impurities. Conventional resins obtained from natural sources can include impurities.

The adhesive composition of this invention exhibits superior finger tack and skin adhesion. The pressure sensitive adhesives can also be applied to a variety of other surfaces at a wide temperature range. The pressure sensitive adhesives can be used in health care products for skin adhesion. Also, the pressure sensitive adhesives can be used in industrial applications in which excellent tack, adhesion and hold characteristics are desired. Superior results have also been obtained for application of the adhesive in cold weather and for application of the adhesive on an oily surface. The pressure sensitive adhesive of the present invention can also be used in a drug delivery system. In this system, a drug can be compounded into the adhesive itself, or the adhesive can be a vehicle to attach a drug reservoir to the skin. The drug migrates from or through the adhesive to the skin.

While the invention has been described with reference to the preferred embodiment, this description is not intended to be limiting. It will be appreciated by those of ordinary skill in the art that modifications may be made without departing from the spirit and scope of the invention.

I claim:

1. A pressure sensitive adhesive composition comprising a solid rubber and a liquid rubber, the weight ratio of said solid rubber to said liquid rubber being from about 1:0.5 to about 1:7 wherein said liquid rubber is selected from the group consisting of liquid isoprene, liquid isoprene-styrene liquid butadiene-styrene, liquid carboxy terminated isoprene, liquid hydroxyl terminated isoprene and liquid hydrogenated isoprene.

2. A pressure sensitive adhesive composition comprising a solid rubber and a liquid rubber, the weight ratio of said solid rubber to said liquid rubber being from about 1:0.5 to about 1.7 wherein said solid rubber is selected from the group consisting of polymerized styrene-butadiene, styrene-isoprene and styrene-ethylene-butylene.

3. A pressure sensitive adhesive composition comprising a solid rubber and a liquid rubber, the weight ratio of said solid rubber to said liquid rubber being from about 1:0.5 to about 1:7 wherein said solid rubber is SBR.

4. A pressure sensitive adhesive composition comprising a solid rubber and a liquid rubber, the weight ratio of said solid rubber to said liquid rubber being from about 1:0.5 to about 1:7 wherein said solid rubber comprises a block polymer having the configuration A-B-A wherein each A is a thermoplastic styrene polymer block, the total block A content being from about 5 to about 50 percent by weight of the block polymer and B is an elastomeric polymer block of isoprene.

5. A pressure sensitive adhesive composition comprising a solid rubber and a liquid rubber, the weight ratio of said solid rubber to said liquid rubber being from about 1:0.5 to about 1:7 wherein said solid rubber comprises a block polymer having the configuration A-B-A wherein each A is a thermoplastic styrene polymer block, the total block A content being from about 5 to about 50 percent by weight of the block polymer and B is an elastomeric polymer block of butadiene.

6. A pressure sensitive adhesive composition comprising a solid rubber and a liquid rubber, the weight ratio of said solid rubber to said liquid rubber being from about 1:0.5 to about 1:7 wherein said solid rubber comprises a block polymer having the configuration A-B-A wherein each A is a thermoplastic styrene polymer block, the total block A content being from about 5 to about 50 percent by weight of the block polymer and B is an elastomeric polymer block of ethylene-butylene.

7. The composition according to claim 4 wherein said block polymer is chosen from the group consisting of radial and linear.

8. The composition according to claim 5 wherein said block polymer is chosen from the group consisting of radial and linear.

9. The composition according to claim 6 wherein said block polymer is chosen from the group consisting of radial and linear.

10. The composition according to claim 1 wherein said composition further comprises an amount of resin which is tackifier free.

11. A pressure sensitive adhesive composition comprising a solid rubber and a liquid rubber, the weight ratio of said solid rubber to said liquid rubber being from about 1:0.5 to about 1:7 and a cross linking agent comprising heat reactive phenolic resins.

12. The composition according to claim 11 further comprising an accelerator of zinc resinate in the amount of about 5-20 parts of said solid rubber.

13. The composition according to claim 1 wherein said composition is cross-linked with radiation.

14. The composition according to claim 1 wherein said composition has a Tg value of less than about $-55°$ C.

15. The composition according to claim 1 wherein said composition is cross-linked.

* * * * *